W. D. GRAHAM.
FEED TROUGH.
APPLICATION FILED DEC. 22, 1916.
1,240,134.
Patented Sept. 11, 1917.
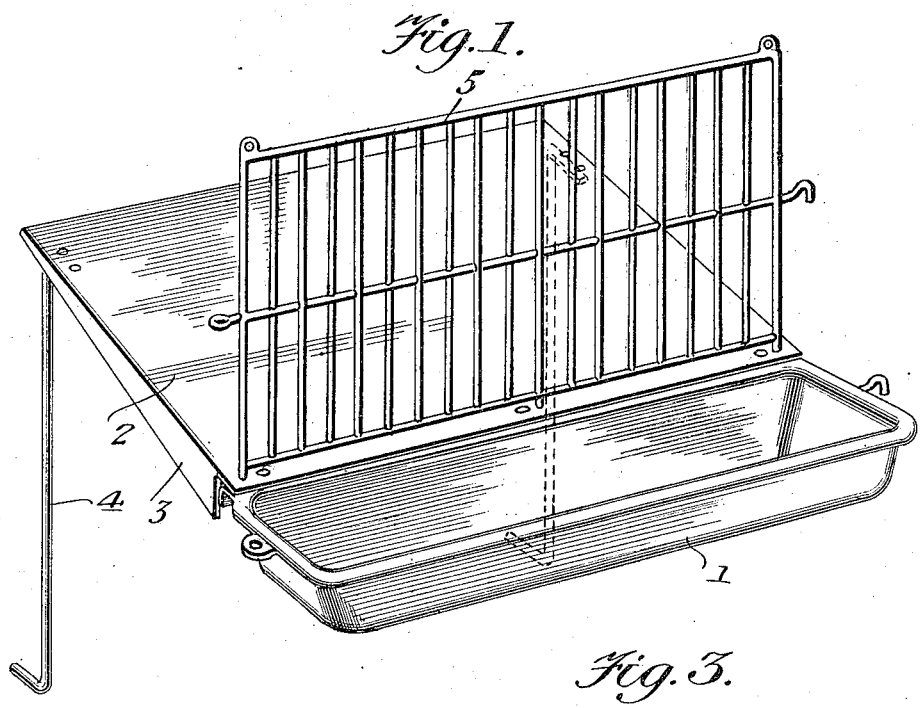
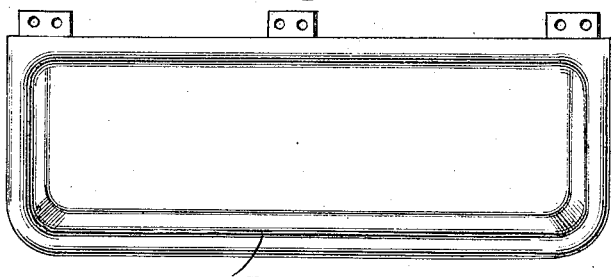
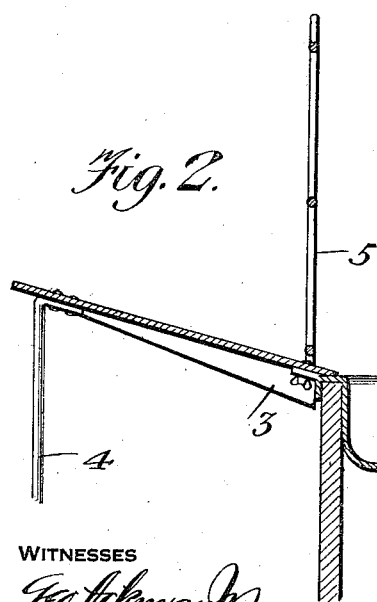
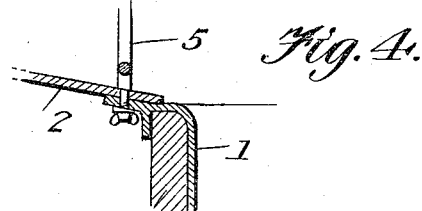
WITNESSES
INVENTOR
W. D. Graham
BY Victor J. Evans
ATTORNEY

UNITED STATES PATENT OFFICE.

WILLIAM D. GRAHAM, OF LAKE PICKETT, FLORIDA.

FEED-TROUGH.

1,240,134.                    Specification of Letters Patent.          Patented Sept. 11, 1917.

Application filed December 22, 1916.   Serial No. 138,470.

*To all whom it may concern:*

Be it known that I, WILLIAM D. GRAHAM, a citizen of the United States, residing at Lake Pickett, in the county of Orange and State of Florida, have invented new and useful Improvements in Feed-Troughs, of which the following is a specification.

This invention relates to economical sanitary feed troughs and it consists in the novel features hereinafter described and claimed.

An object of the invention is to provide a trough which is cheaper to manufacture and which may retain the feed in a sanitary condition ready for the animal or animals which use the trough.

With this object in view the trough comprises a body having a panel disposed in an inclined position with relation to the same. A grating of rods or any other suitable material is mounted at the lower edge of the panel and is vertically disposed with relation to the body of the trough. When grain is used in the trough it is poured upon the panel and may gravitate down into the trough where the animal may feed upon the same. In the event that hay or straw is placed in the structure it is deposited upon the said panel behind the grating and the animal may have access to the same by pulling it through the grating in small quantities whereby the small bits will fall into the trough and not upon the floor and thus preventing waste.

In the accompanying drawing:

Figure 1 is a perspective view of the trough.

Fig. 2 is a transverse sectional view of the same.

Fig. 3 is a top plan view of the trough body.

Fig. 4 is a fragmentary transverse sectional view of the same.

The trough comprises a body 1 which may be of wood or metal and which is formed devoid of sharp angles or corners thus preventing the grain from accumulating in the trough and spoiling. A panel 2 of wood or metal is supported in inclined position and extends upwardly from the rear edge of the trough body 1. The said panel is provided at its ends with downwardly disposed strengthening flanges 3 and the upper portion of the said panel is supported upon legs 4. A grating 5 is supported at the lower edge of the panel 2 and is vertically disposed with relation to the trough body 1. The said grating is preferably formed of metallic rods and the spaces between the rods are sufficient to permit the animal to insert its head therethrough to get at the grain or feed which is deposited upon the said panel.

In use the grain is poured upon the said panel and may gravitate down the same into the trough. When hay or straw is used as feed it is positioned upon the panel behind the grating and the animal may insert its lips through the spaces of the grating and get at the hay or straw. Thus the hay or straw is withdrawn from the panel in small bits and consequently the said feed is not wasted.

Having described the invention what is claimed is:—

A feed trough comprising a trough body having at its rear edge a flange which is spaced from the body, a panel extending upwardly and rearwardly from the edge of the body and from the said flange, and provided at its ends with depending flanges which bear at their ends against the first mentioned flange, legs supporting the upper rear portion of the panel, and a grating mounted upon the panel at the lower forward edge thereof and vertically disposed with relation to the trough body.

In testimony whereof I affix my signature.

WILLIAM D. GRAHAM.